United States Patent [19]
Mori et al.

[11] 3,867,689
[45] Feb. 18, 1975

[54] MEASURING APPARATUS UTILIZING VARIABLE IMPEDANCE ELEMENTS

[75] Inventors: Toshihiro Mori, Yokohama; Seigo Ando, Kawasaki, both of Japan

[73] Assignee: Nippon Kokan Kabushiki Kaisha, Tokyo, Japan

[22] Filed: Aug. 29, 1973

[21] Appl. No.: 392,763

[30] Foreign Application Priority Data
Aug. 31, 1972 Japan.............................. 47-87435

[52] U.S. Cl. ............................. 324/40, 73/362 AR
[51] Int. Cl. ............................................ G01r 33/14
[58] Field of Search ................. 324/40, 34 R, 62; 73/362 AR

[56] References Cited
UNITED STATES PATENTS

| | | | |
|---|---|---|---|
| 3,461,400 | 8/1969 | Koda................................. | 324/40 X |
| 3,489,955 | 1/1970 | Freeborn .......................... | 324/40 X |
| 3,568,044 | 3/1971 | Elazar............................... | 324/62 X |
| 3,613,454 | 10/1971 | McFadin ......................... | 73/362 AR |
| 3,688,581 | 9/1972 | Le Quernec ................... | 73/362 AR |

OTHER PUBLICATIONS
Oswald, Thermistor Temperature to Current Transducer, IBM Technical Disclosure Bulletin, May 1965, pp. 1124–1126.

Primary Examiner—Stanley T. Krawczewicz
Attorney, Agent, or Firm—Flynn & Frishauf

[57] ABSTRACT

The measuring apparatus comprises an impedance element which is energized by a reference voltage of a predetermined voltage level and has its impedance varied with variations in the physical properties of an object to be measured, and a negative impedance network, with its input impedance set at a negative value, which includes an amplifier and a positive feedback impedance element connected between the input and output terminals of the amplifier and is connected in series or parallel with the first mentioned impedance element. With the arrangement, the variations in the physical properties of the object can be detected in an extremely enlarged state in the form of a terminal voltage appearing across the first mentioned impedance element or an output voltage appearing across the output terminals of the negative impedance network.

9 Claims, 8 Drawing Figures

MEASURING APPARATUS UTILIZING VARIABLE IMPEDANCE ELEMENTS

BACKGROUND OF THE INVENTION

This invention relates to an improvement on a measuring apparatus wherein the variation in the physical properties of an object comprised of magnetic or electrically conductive material is detected by utilizing an impedance element whose impedance changes with the variation in the physical properties of the object being measured.

FIG. 1 shows a connection diagram of a prior art measuring apparatus which is constructed to measure the magnetic or electric characteristic of a sample 12 comprised of magnetic or electrically conductive material such as iron sheet, steel sheet, tin sheet, copper sheet or aluminum sheet. The measuring apparatus 11 comprises a bridge circuit 13 formed by two similarly wound coils L1 and L2 and two impedance elements Z1 and Z2, and a source of measuring input signal 14 in the form of a conventional oscillator connected to impress across the input terminals of the bridge circuit 13 an AC signal having a predetermined frequency (generally 5 to 100 kHz) and a predetermined voltage (generally 1 to 2 peak-to-peak volts).

One of the two coils, for example, coil L1, is a detection coil facing the sample 12 being measured with a predetermined gap G (generally from 2 to 10mm), whereas the other coil L2 is a reference or dummy coil spaced with the gap G from a reference 15 made of the same material as the sample 12 and having standard physical properties.

It is assumed that the sample 12 is continuously moved in a predetermined lengthwise direction. If, under this condition, such physical defects as pin holes, scratches, uneven thickness, concaves, convexes, adulteration by impurities, insufficiently welded portions, or temperature variations occur in the sample 12, then the electrical conductivity or magnetic permeability of the sampel 12 will vary at the defective portions. Consquently, the quantity of the eddy current which flows through the sample 12 in accordance with the magnitude of the AC magnetic field induced across the detection coil L1 excited by the input signal from the source 14 will vary, causing the effective impedance of the detection coil to be changed. Accordingly, detection of changes in the level of an output voltage appearing across the output terminals of the bridge circuit 13 caused by variations in the effective impedance of the detection coil 13 can readily indicate those portions of the sample 12 where the magnetic or electrical characteristic thereof has changed.

Such measuring apparatus, however, has the disadvantage of relatively decreasing its sensitivity.

For improvement on the sensitivity of the measuring apparatus, the customary practice is to connect capacitors C1 and C2 in parallel or series with respective coils L1 and L2 as shown by dotted lines in FIG. 1 to form parallel or series resonance circuits 161 and 162 which are tuned to the frequency of the input signal from the source 14.

Although the conventional measuring apparatus provided with a resonance circuit has a higher sensitivity than any prior art apparatus not provided therewith, the former apparatus has the disadvantage of not only carrying out measurement merely at the resonant frequency of the resonance circuit, but it also has a reduced measuring accuracy due to fluctuation in the frequency of the input voltage as the sensitivity is enhanced.

Other examples of measuring apparatus for determining the physical properties of an object comprised of magnetic or electrically conductive material as described above include a temperature measuring apparatus utilizing a resistance element which is disposed close to, or in contact with, the object being measured and whose resistance varies with the temperature variation of the measured object, and a resistance wire strain gauge employing a strain-resistance wire disposed in contact with the measured object and having its resistance varied with the deformation of the object.

In such temprature measuring apparatus and resistance wire strain gauge, it is impossible to form a resonance circuit as in the measuring apparatus shown in FIG. 1 and ultilizing a detection coil whose effective impedance changes with the variations in the physical properties of the measured object. Accordingly, the temperature measuring apparatus and the resistance wire strain gauge respectively have a relatively low sensitivity, as in the non-resonance type measuring apparatus described above.

SUMMARY OF THE INVENTION

Accordingly, it is an object of this invention to provide a non-resonant type measuring apparatus capable of detecting those portions of a measured sample magnetic of mmagnetic or electrically conductive material which bear the above-mentioned abnormal physical properties with substantially the same sensitivity as the prior art measuring apparatus utilizing resonance circuits, and without being affected by the frequency of an input signal from a measuring input signal source.

According to this invention, the above and other objects can be accomplished by providing a measuring apparatus for detecting variations in the physical properties of an object to be measured by using an impedance element whose impedance changes in accordance with said variations in the physical properties of the object under the condition where an input reference voltage is applied thereacross, characterized in that a negative impedance network, with its input impedance set at a negative value, which comprises an amplifier connected to amplify the voltage appearing across the impedance element and having its amplifiction factor chosen to a larger value than 1; and a positive feedback impedance element connected between the input and output of the amplifier, the negative impedance network being connected in parallel or series with the impedance element.

DESCRIPTION OF THE PREFERRED EMBODIMENTS

Figure 1:
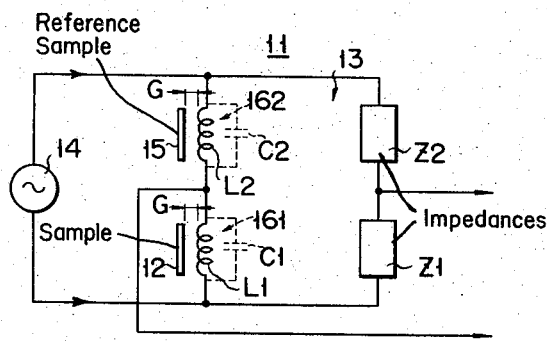
FIG. 1 shows a schemtic circuit diagram of the prior art measuring apparatus utilizing a bridge circuit.

A preferred embodiment of the invention schematically illustrated in FIG. 2 comprises a source 21 of input reference voltage, an amplifier 22 having its amplification factor chosen to a larger value than 1 as later described and having two input terminals I1 and I2 connected across the source 21 via an impedance element 26 and two output terminals 01 and 02, and a negative impedance network 24, with its input impedance set at a negative value as later described, comprised of positive feedback impedance element 23 connected between the input terminal I1 and the output terminal 01 of the amplifier 22. An impedance element 25 which is disposed close to, or in contact with, a measured sample (not shown) comprised of magnetic or electrically conductive material such as iron, steel, copper, tin or aluminum sheet and whose impedance varies in accordance with the variations in the physical properties of the object to be measured is connected across the input reference voltage source 21 via the impedance element 26.

In this measuring apparatus, the input impedance Zin as seen from the input side of the impedance element 25 where the output terminals 01 and 02 are open-circuited is expressed by $$Zin = Z11 \cdot Zi/Z11 + Zi \quad (1)$$

where $Z11$: the impedance of the impedance element 25; and
$Zi$: the input impedance of the negative impedance network 24.

Denoting the amplification factor of the amplifier 22 as A and the impedance of the positive feedback impedance element 23 as $Z12$, the input impedance Zi of the negative impedance network 24 is expressed as follows:

$$Zi = Z12/1 - A \quad (2)$$

Substituting equation (2) into equation (1), we obtain $$Zin = \frac{\frac{Z11 \cdot Z12}{1-A}}{Z11 + \frac{Z12}{1-A}} = \frac{Z11}{1 - \frac{Z11}{Z12}(A-1)} \quad (3)$$

As equation (3) clearly shows, the input impedance Zin with the output terminals 01 and 02 open-circuited varies from the impedance Z11 of the impedance element 25 to infinity or to a negative value dependng upon the impedances Z11 and Z12 of the impedance element 25 and positive feedback impedance element 23 and the amplification factor A of the amplifier 22.

Accordingly, by previously selecting the values of the impedances Z11 and Z12 of the impedance element 25 and the feedback impedance element 23 and the value of the amplication factor A of the amplifier 22 so that the input impedance Zin, with output terminals 01 and 02 open-circuited, can have as high a value as possible, preferably an infinite value (under these conditions, the input admittance as seen from the input side of the impedance element 25 will be reduced to zero), the input terminals of the impedance element 25 should be apparently open-circuited, thereby substantially preventing the flow of any current from the input reference voltage source 21 to the impedance element 25. For this reason, the circuit shown in FIG. 2 acts as a circuit equivalent to the conventional parallel resonance circuit so that, when the predetermined reference voltage is impressed upon the impedance element 25 from the source 21, variations in the physical properties of the measured object can be detected in an extremely enlarged state in the form of a terminal voltage appearing across the impedance element 25 or an output voltage appearing across output terminals 01 and 02.

Under these conditions, it is possible to maintain the accuracy of measurement at a substantially constant value over a wide frequency range without being affected not only by the frequency input reference voltage supplied from source 21 but also by the variation in the frequency of the input reference voltage. Moreover, when a high amplification factor is selected for the amplifier 22 and when as high a negative feedback as possible is applied to decrease the amplification factor to, for example, less than 10, the circuit shown in FIG. 2 can operate extremely stably, Moreover, the input impedance Zin can be readily adjusted by making the amount of the negative feedback variable.

Figure 3:
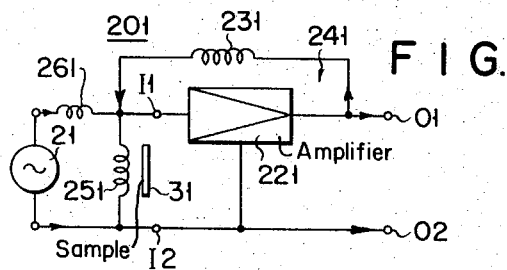
FIGS. 3 to 8 show shematic circuit diagrams of various modified embodiments of measuring apparatus according to this invention.

FIG. 3 shows a modified embodiment of this invention constructed in accordance with the principle described hereinabove.

Figure 2:
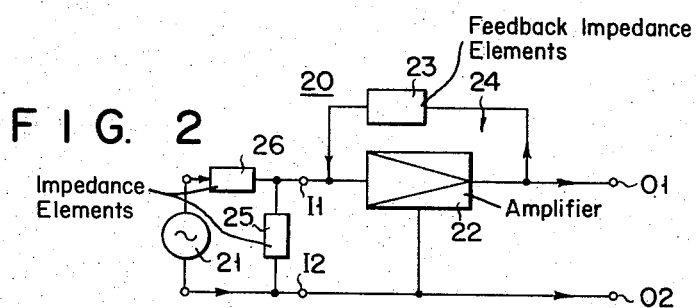
FIG. 2 shows a block diagram showing the basic construction of a measuring apparatus according to this invention utilizing an impedance element whose impedance varies in accordance with variations in the physical properties of a measured object comprised of magnetic or electrically conductive material.

In a measuring device 201 shown in FIG. 3, inductance coils 231, 251 and 261 are respectively replaced by the corresponding impedance elements 23, 25 and 26 used in the embodiment of FIG. 2, the inductance coil 231 acting as a positive feedback impedance element connected between the input I1 and output 01 of an amplifier 221 which has its amplification factor chosen to have a larger value than 1 and which is included in a negative inductance network 241, and the inductance coil 251 functioning as an impedance element disposed close to a measured sample 31 comprised of magnetic or electrically conductive material and having its impedance varied with changes in the physical properties of the sample 31 under the condition where voltage from the input reference voltage source 21 is applied across the inductance coil 251 via the inductance coil 261.

Figure 4:
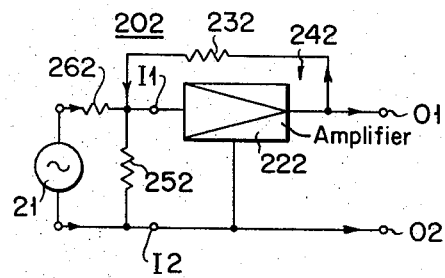

In a modified measuring apparatus 204 shown in FIG. 4, resistance elements 232, 252 and 262 are respectively replaced by the corresponding impedance elements 23, 25 and 26 used in the embodiment of FIG. 2. The resistance element 252 is disposed close to, or in contact with, a measured sample (not shown) comprised of magnetic or electrically conductive material as described above and has impedance varied with changes in the physical properties of the sample under the condition where voltage from the input reference voltage source 21 is applied across the resistance element 252 via the resistance element 262. A negative resistance network 242 which comprises an amplifier 222 connected in parallel (or series) with the resistance element 252, and the positive feedback resistance element 232 connected between the input I1 and output 01 of the amplifier 222 has its input impedance set at a negative value by previously selecting the amplification factor of the amplifier 222 to a larger value than 1.

It will be understod that the measuring apparatus constructed as shown in FIGS. 3 and 4 can operate in the same manner as, and can obtain the same effect as that shown in FIG. 2.

Figure 5:
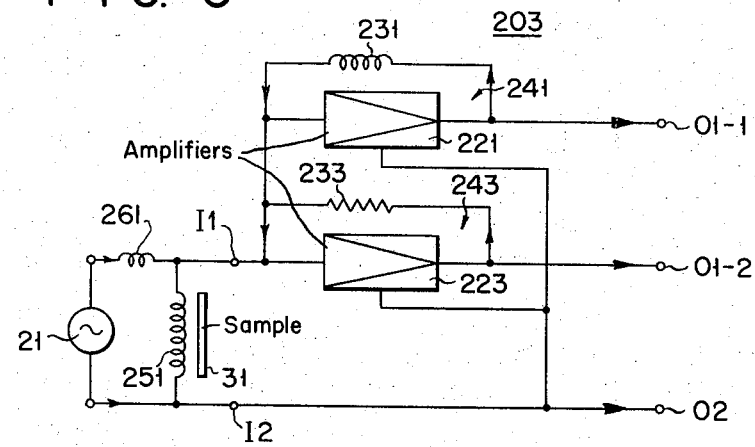

As is well known in the art, since the inductance coil 251 actually comprises an inductance component and a resistance component, in another modified measuring apparatus 203 shown in FIG. 5, a negative resistance network 243 including an amplifier 223 with its amplification factor chosen to have a larger value than 1 and a positive feedback resistance element 233 connected between the input I1 and output 01-2 of the amplifier 223 a feedback resistor 233 is connected in parallel with the negative inductance network 241 having the same construction as that of FIG. 3.

With the modified measuring apparatus 203 shown in FIG. 5, it is possible to independently detect variations in the inductance and resistance components of the inductance coil 251 whose effective impedance changes in accordance with variations in the physical properties of the sample 31 in respectively enlarged forms through the actions of the negative inductance network 241 and the negative resistance network 243.

Figure 6:
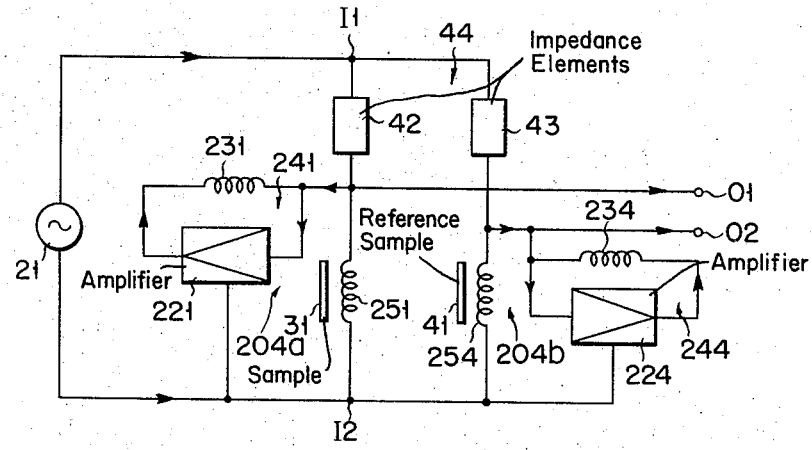

FIG. 6 is a schematic circuit diagram of a measuring apparatus according to another embodiment of this invention. This measuring apparatus 204 comprises a first measuring circuit 204a including an inductance coil 251 disposed, as in the embodiment of FIG. 3, close to a measured sample 31 comprised of magnetic or electrically conductive material as described above and a negative inductance network 241 connected parallel with said inductance coil 251 and having substantially the same construction as that of FIG. 3; and a second measuring circuit 204b formed of an inductance coil 254 arranged in the same way as the aforesaid inductance coil 251 and positioned adjacent to a reference sample 41 of the same material as the sample 31 on which measurement should be based, and a negative inductance network 244 connected in parallel with said inductance coil 254, and including an amplifier 224 with its amplification factor chosen to have a larger value than 1 and a positive feedback inductance coil 234 connected between the input and output of the amplifier 224. The first and second measuring circuits 204a and 204b and two impedance elements 42 and 43 jointly constitute a bridge circuit 44 having input terminals I1 and I2 connected across the input reference voltage source 21.

Where the sample 31 presents any of the aforesaid abnormal physical defects, the measuring apparatus 204 of the above-mentioned arrangement can detect, as easily understood, said abnormal physical defects presented in the sample 31 in an enlarged state in the form of an output voltage appearing across the output terminals 01 and 02 of the bridge circuit 44.

Figure 7:
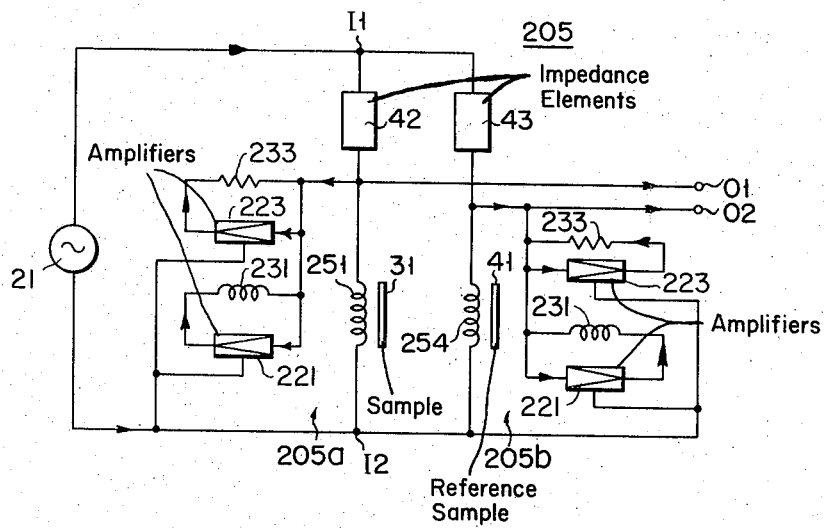

In still another modified measuring apparatus 205 shown in FIG. 7, two measuring circuits 204a and 204b shown in FIG. 6 are respectively replaced by two measuring circuits 205a and 205b each having the same construction as that 203 of FIG. 5.

Figure 8:
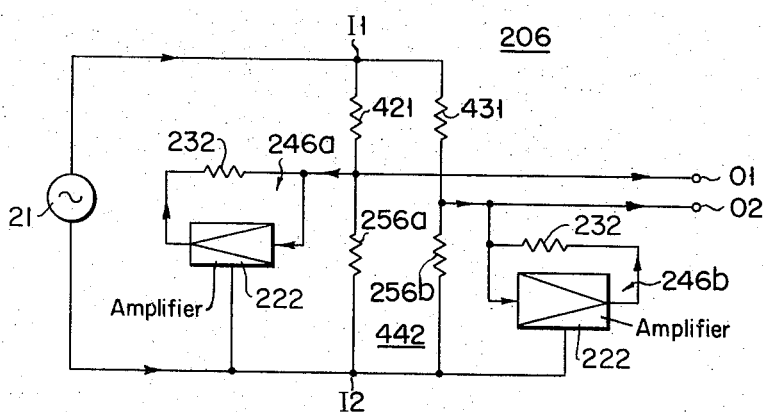

In a further modified measuring apparatus 206 shown in FIG. 8, the inductance coil 251 shown in FIG. 6 is replaced by a resistance element 256a having the same electrical characteristic as element 252 of FIG. 4 and the reference inductance coil 254 shown in FIG. 6 is replaced by a resistance element 256b having the same value as the resistance of the resistance element 256a when facing that portion of a measured sample (not shown) comprised of magnetic or electrically conductive material as described above which bears a standard or reference physical property free from the above-mentioned abnormal defects. Further, negative resistance networks 246a and 246b each having the same construction as that of network 242 of FIG. 4 are connected in parallel with respective resistance elements 256a and 256b so as to form a bridge circuit 442 together with resistance elements 421 and 431.

To simplify the description, the same or corresponding elements shown in FIGS. 3 to 8 have been designated by the same or corresponding reference numerals as those used in connection with FIG. 2.

It should be understood that the invention is by no means limited to the particular embodiments illustrated but that many changes and modifications may be permissible without departing from the scope of the invention.

For example, in all of the foregoing examples, an amplifier for an impedance element whose value varies in accordance with the variation in the condition of an object to be measured was connected in parallel with a negative impedance network including a feedback impedance element connected between the input and output terminals of the amplifier. However, it should be understood that the same object can be accomplished by serially connecting these circuit elements.

The embodiments shown in FIGS. 3, 4 and 8 can be modified by respectively changing elements or circuits 231, 232, 246a or 246b for a sensitive resistor element such as a sensitive magnet diode, a semiconductor gauge or a thermistor.

What we claim is:

1. A measuring apparatus for detecting variations in the physical properties of a magnetic or electircally conductive sample being measured by utilizing a first impedance element disposed close to, or in contact with, the sample and having its impedance varied with the physical properties of the sample under the condition where a predetermined voltage from an input reference voltage source generating said voltage is applied through a second impedance element to the first impedance element, characterized by:

means for detecting the variation of the impedance of the first impedance element in an enlarged state including a negative impedance network which comprises an amplifier coupled to the first impedance element and a positive feedback impedance element connected between the input and output of said amplifier and which has its input impedance set at a negative value by previously selecting the amplification factor of said amplifier to a larger value than 1, the detected variations in physical properties being a function of at least one of a terminal voltage appearing across the first impedance element and an output voltage appearing across the output terminals of said amplifier.

2. The measuring apparatus as claimed in claim 1 wherein said first impedance element comprises an inductance element and said negative impedance network comprises a negative inductance network and a negative resistance network respectively coupled with said first impedance element.

3. The measuring apparatus as claimed in claim 1 wherein said first impedance element comprises an inductance element and said negative impedance network comprises a negative inductance network and a negative resistance network respectively coupled with said first impedance element.

4. The measuring apparatus as claimed in claim 1 wherein said first impedance element comprises a resistance element and said negative impedance network comprises a negative resistance network which includes a resistance element as said positive feedback impedance element.

5. The measuring apparatus as claimed in claim 1 further comprising a first measuring circuit including said first impedance element and said negative impedance network; and a second measuring circuit including a reference impedance element having the same impedance value as said first impedance element under normal conditions and another negative impedance network coupled with said reference impedance element, said first and second measuring circuits constituting a bridge circuit together with two other impedance elements.

6. The measuring apparatus as claimed in claim 5 wherein said another negative impedance network is coupled in series with said reference impedance element.

7. The measuring apparatus as claimed in claim 5 wherein said another negative impedance network is coupled in parallel with said reference impedance element.

8. The measuring apparatus as claimed in claim 1 wherein the detected variations in physical properties are a function of a terminal voltage appearing across the first impedance element.

9. The measuring apparatus as claimed in claim 1 wherein the detected variations in physical properties are a function of an output voltage appearing across the output terminals of said amplifier.

* * * * *